(12) United States Patent
Modak et al.

(10) Patent No.: US 11,272,663 B2
(45) Date of Patent: Mar. 15, 2022

(54) HARVESTER HEAD REEL WITH EXTENDABLE BAT

(71) Applicant: Deere & Company, Moline, IL (US)

(72) Inventors: Shreyas P. Modak, Thane (IN); Daniel S. Hoffman, Bettendorf, IA (US); Bryan R. Yanke, Eldridge, IA (US)

(73) Assignee: DEERE & COMPANY, Moline, IL (US)

(*) Notice: Subject to any disclaimer, the term of this patent is extended or adjusted under 35 U.S.C. 154(b) by 703 days.

(21) Appl. No.: 15/909,488

(22) Filed: Mar. 1, 2018

(65) Prior Publication Data
US 2019/0269072 A1 Sep. 5, 2019

(51) Int. Cl.
| | | |
|---|---|---|
| *A01D 57/04* | (2006.01) | |
| *A01D 57/02* | (2006.01) | |
| *A01D 57/03* | (2006.01) | |
| *A01D 57/12* | (2006.01) | |
| *A01D 80/02* | (2006.01) | |
| *A01D 41/14* | (2006.01) | |

(52) U.S. Cl.
CPC .......... *A01D 57/04* (2013.01); *A01D 41/148* (2013.01); *A01D 57/02* (2013.01); *A01D 57/03* (2013.01); *A01D 57/12* (2013.01); *A01D 80/02* (2013.01)

(58) Field of Classification Search
CPC ...... A01D 57/03; A01D 57/04; A01D 41/148; A01D 57/02; A01D 57/12
See application file for complete search history.

(56) References Cited

U.S. PATENT DOCUMENTS

| | | | | |
|---|---|---|---|---|
| 470,061 | A | * 3/1892 | Lindley | ............... A01D 57/04 56/226 |
| 2,406,706 | A | 8/1946 | Oehler et al. | |
| 2,811,821 | A | 11/1957 | Irvine | |
| 3,338,036 | A | * 8/1967 | Hurlburt | ............... A01D 57/12 56/14.4 |
| 3,400,526 | A | * 9/1968 | Tuft | ............... A01D 57/03 56/220 |
| 3,555,796 | A | * 1/1971 | Baumeister | ............ A01D 57/12 56/221 |
| 3,561,198 | A | * 2/1971 | Herbsthofer | ......... A01D 41/148 56/11.9 |
| 3,664,101 | A | 5/1972 | Hurlburt | |

(Continued)

FOREIGN PATENT DOCUMENTS

| | | |
|---|---|---|
| CA | 2677537 | 3/2010 |
| CA | 2665580 | 11/2010 |

(Continued)

OTHER PUBLICATIONS

EP Search Report for 19157440.9-1006 dated Jul. 29, 2019.

(Continued)

*Primary Examiner* — Thomas B Will
*Assistant Examiner* — Joan D Misa
(74) *Attorney, Agent, or Firm* — Taft Stettinius & Hollister LLP; Stephen F. Rost

(57) ABSTRACT

A harvester head reel may include a bat support and an extendable bat supported by the bat support. The extendable bat may have a first segment and a second segment overlapping the first segment. The harvester head reels may further include a first finger extending from the first segment and a second finger extending from the second segment.

19 Claims, 11 Drawing Sheets

(56) References Cited

U.S. PATENT DOCUMENTS

| | | | | |
|---|---|---|---|---|
| 3,722,194 A | * | 3/1973 | Halls | A01D 57/03 56/226 |
| 3,724,183 A | * | 4/1973 | Hurlburt | A01D 57/03 56/14.3 |
| 3,849,974 A | * | 11/1974 | James | A01F 15/08 56/226 |
| 4,068,454 A | | 1/1978 | Webb | |
| 4,120,137 A | | 10/1978 | Schoeneberger | |
| 4,124,970 A | | 11/1978 | Bernhardt | |
| 4,270,339 A | * | 6/1981 | Wolfe | A01D 41/148 172/532 |
| 4,487,004 A | * | 12/1984 | Kejr | A01D 41/14 56/14.4 |
| 4,910,946 A | * | 3/1990 | Underwood | A01D 34/30 56/14.4 |
| 5,768,870 A | | 6/1998 | Talbot | |
| 6,442,918 B1 | | 9/2002 | Fox | |
| 6,502,379 B1 | | 1/2003 | Snider | |
| 8,176,716 B2 | * | 5/2012 | Coers | A01D 57/02 56/364 |
| 9,338,943 B2 | | 5/2016 | Herringshaw et al. | |
| 9,578,806 B2 | | 2/2017 | Weeks et al. | |
| 9,622,413 B2 | | 4/2017 | Neely et al. | |
| 10,426,091 B2 | * | 10/2019 | Honey | A01D 57/04 |
| 10,568,263 B2 | * | 2/2020 | Cook | A01D 41/141 |
| 10,765,065 B2 | * | 9/2020 | Armando | A01D 57/02 |
| 10,779,471 B2 | * | 9/2020 | Bongiovanni | A01D 41/148 |
| 2018/0242525 A1 | | 8/2018 | Schwinn | |
| 2019/0124842 A1 | * | 5/2019 | Ricketts | A01D 57/04 |

FOREIGN PATENT DOCUMENTS

| | | | | |
|---|---|---|---|---|
| CN | 202799662 | | 3/2013 | |
| CN | 203136539 | | 8/2013 | |
| CN | 203518992 | | 4/2014 | |
| CN | 203587609 | | 5/2014 | |
| CN | 203884210 | | 10/2014 | |
| CN | 204244714 | | 4/2015 | |
| CN | 204375324 | | 6/2015 | |
| DE | 202019004366 U1 | * | 11/2019 | A01D 41/148 |
| EP | 2422608 | | 2/2012 | |
| EP | 3669635 A1 | * | 6/2020 | A01D 57/03 |
| FR | 2075421 A5 | * | 10/1971 | A01D 57/02 |
| JP | 2013027367 | | 2/2013 | |
| KR | 20160049125 | | 5/2016 | |
| KR | 20160049129 | | 5/2016 | |
| KR | 20160067396 | | 6/2016 | |
| KR | 20160073226 | | 6/2016 | |
| KR | 20170074021 | | 6/2017 | |
| WO | WO2017041177 | | 3/2017 | |
| WO | WO-2020127683 A1 | * | 6/2020 | A01D 57/03 |

OTHER PUBLICATIONS

New Holland 499 Mower Conditioner Nice HYD Swing and Drive, https://www.youtube.com/watch?v=-nUtEUTmfXU, uploaded Oct. 28, 2021.

New Holland 499 Haybine, https://www.youtube.com/watch?v=SWD_GFFUic4, uploaded Oct. 28, 2021.

* cited by examiner

HARVESTER HEAD REEL WITH EXTENDABLE BAT

BACKGROUND

Harvesters are utilized to gather and harvest a crop. Such harvesters may include a head which separates the crop from the underlying growing medium and feeds the crop into the harvester. Depending upon the crop being harvested, such heads may include a reel having a hub which supports multiple angularly spaced bats that carry tines or fingers. The reel is rotated such that the fingers carried by the bats engage and gather the crop being harvested.

Figure 1:
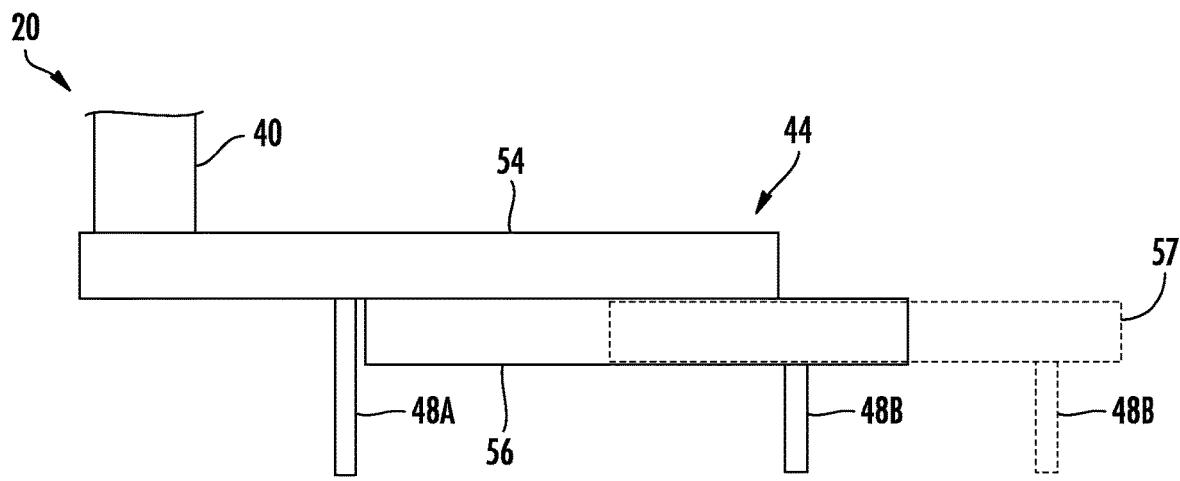
FIG. 1 is a schematic diagram of portions of an example harvester head reel, illustrating a bat in a retracted position and an extended position (shown in broken lines).

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example harvester head reels and methods that adjust a length of the bats during rotation of the harvester head. Adjusting the length of the bats may facilitate enhanced crop harvesting efficiency. Adjusting the length of the bats (and the positioning of their carried tines) may reduce crop gathering gaps along the length of the reel, reducing crop pileup at such gaps. Adjusting the length of the bats may further facilitate smoother crop flow and reduce crop loss.

Disclosed herein are a harvester head reels that may include a bat support and an extendable bat supported by the bat. The extendable bat has a first segment and a second segment overlapping the first segment. The harvester head reels may further include a first finger extending from the first segment and a second finger extending from the second segment. In one implementation, the second segment telescopes into and from the first segment. In another implementation, the second segment is slidable along an exterior of the first segment. In another implementation, a sleeve is provided which guide sliding movement of the second segment parallel to the first segment. In one implementation, the second segment is connected to the first segment by a flexible connector. In some implementations, the bat may further comprise a third segment which overlaps the second segment and which supports a third finger.

In some implementations, at least one of the first segment and the second segment may include a slot, wherein one of the first finger and the second finger is slidable into and along the slot. The slot facilitates a greater degree of overlap between the first and second segments, facilitating a longer second segment and a greater extendable length. In some implementations, one of the first finger and the second finger maybe collapsible so as to be receivable within one of the first segment and the second segment. As with the slot, a collapsed ability of the first finger and/or the second finger facilitate a greater degree of overlap, facilitating a longer second segment and a longer second length. The slot and the collapsible fingers further facilitate use of a greater number of fingers on the second segment without limiting the extent ability or collapse ability of the second segment with respect to the first segment.

In some implementations, the length of the bat is controllably adjusted during rotation of the reel. In some implementations, length of the bat is controlled based upon an angular position of the bat about a longitudinal axis of the reel as the bat rotates about the longitudinal axis of the reel.

In one implementation, such control is provided by a cam and cam follower arrangement with a stationary cam and a cam follower coupled to the second segment and in engagement with the cam. Rotation of the reel and rotation of the bat about the longitudinal axis of the real moves the cam follower along the cam to extend and retract the second segment relative to the first segment based upon the angular positioning of the bat about the longitudinal axis of the reel. In such an implementation, cam and cam follower arrangement may extend and retract the second segment relative to the first segment in accordance with an extension-retraction profile during rotation of the reel. In some implementations, an actuator may be operably coupled to one of the cam and the cam follower to move one of the cam and the cam follower so as to selectively adjust the extension-retraction profile.

In another implementation, a powered actuator may be used to control extension and retraction of the second segment relative to the first segment. For example, in one implementation, a sensor may sense the angular positioning of the reel, wherein the controller outputs control signals causing the powered actuator to extend or retract the second segment relative to the first segment based upon the sensed angular positioning of the reel.

Disclosed herein is an example crop harvesting method. The method may involve rotating a harvester head reel having extendable bat and adjusting a length of the extendable bat during rotation of the harvester head reel. In one implementation, the harvester head reel may have a second extendable bat. The method may further involve adjusting the second extendable bat to a second length, different than the length, while the first extendable bat is at the length.

Disclosed herein is an example bat for a harvester head reel. The example bat may include a first segment supporting a series of spaced fingers. The example bat may further include a second segment supporting at least one finger, wherein the second segment overlapping the first segment and slidable between an extended state and a retracted state relative to the first segment.

For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of an application-specific integrated circuit (ASIC). Unless otherwise specifically noted, the controller is not limited to any specific combination of hardware circuitry and software, nor to any particular source for the instructions executed by the processing unit.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the phrase "configured to" denotes an actual state of configuration that fundamentally ties the stated function/use to the physical characteristics of the feature proceeding the phrase "configured to".

FIG. 1 schematically illustrates portions of an example harvester head reel 20 for use with a combine harvester or other similar harvesting device that employs a reel to gather crops. Harvester head reel 20 comprises bat support 40, extendable bat 44 and bat fingers 48A, 48B (collectively referred to as bat fingers 48). Bat support 40 comprises a structure extending from extendable bat 44 and supporting extendable bat 44. In one implementation, bat support 40 may comprise one of multiple spokes or portions of a star which supports multiple individual extendable bats, similar to bat 44, at circumferentially spaced angular positions about a central hub or shaft.

Extendable bat 44 supports fingers 48. During rotation of reel 20, extendable bat 44 is rotated about an axis of the hub or shaft of the reel. Extendable bat 44 comprises segments 54 and 56. Segment 54 extends from bat support 40 and supports finger 48A. Segment 36 extends alongside segment 54, overlapping portions of segment 54 while supporting finger 48B. Segment 56 is movable relative to segment 54 from a first overlapping and retracted state shown in solid lines to a second overlapping an extended state shown in broken lines. In one implementation, segment 56 is a free end 57 cantilevered from segment 54. The extension of segment 56 relative to segment 54 provides bat 44 with an extendable length. Adjusting the length of bat 44 may facilitate enhanced crop harvesting efficiency. Adjusting the length of bat 44 (and the positioning of their carried tines or fingers 48) may reduce crop gathering gaps along the length of the reel 20, reducing crop pileup at such gaps. Adjusting the length of that 44 may further facilitate smoother crop flow and reduce crop loss.

In one implementation, segment 56 telescopically extends from segment 54. For example, in one implementation, segment 56 comprises a tube receiving segment 54. In another implementation, segment 54 may comprise a tube receiving portions of segment 56. In another implementation, segment 56 may extend on one side of segment 54, being retained alongside segment 54 by a guiding sleeve. In some implementation, segments may be interconnected by a flexible band, strap or other flexible connector.

Fingers 48 extends from bat 44. Finger 48A extend from segment 54. Finger 48B extend from segment 56. Fingers 48 (also sometimes referred to as tines) may be resiliently flexible. Fingers 48 engage and gather the crops being harvested during rotation of harvester head reel 20. In the example illustrated, fingers are provided with length such that the tips of such fingers are equally spaced from the rotational axes about which the harvester head reel 20 rotates. In the example illustrated, finger 48A has a length greater than that a finger 48B. In other implementations, such fingers may extend at different lengths in two different extents with respect to the rotational axis of a harvester head reel 20.

Figure 2:
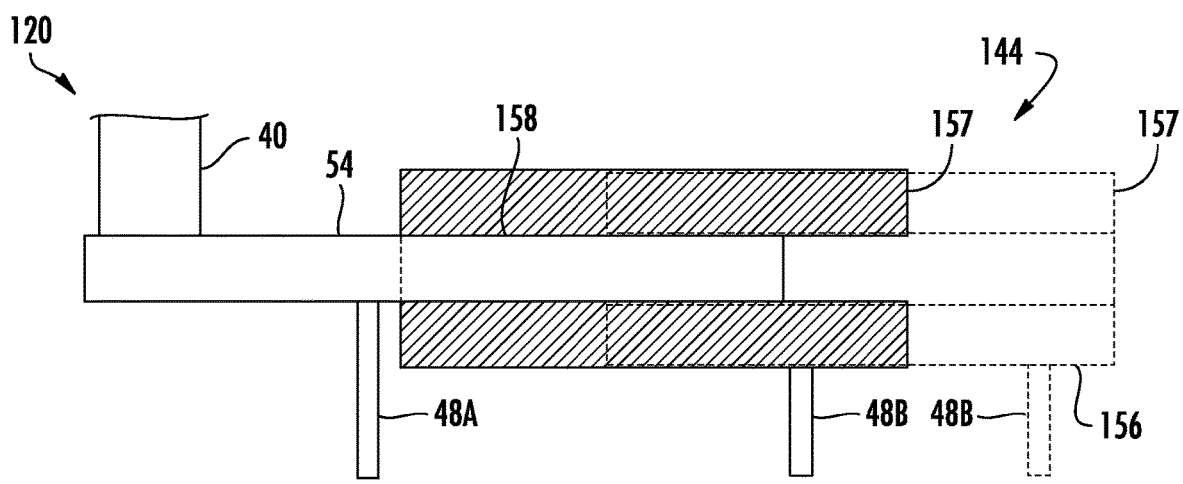
FIG. 2 is a sectional view of portions of another example harvester head reel, illustrating a bat in a retracted position and an extended position (shown in broken lines).

FIG. 2 schematically illustrates portions of an example harvester head reel 120 for use with a combine harvester or other similar harvesting device that employs a reel together crops. Harvester head reel 120 is similar to harvester head reel 20 described above except that harvester head reel 120 is specifically illustrated with bat 144 having a telescopic arrangement of coincident segments. Harvester head reel 120 comprises bat support 40, extendable bat 144 and bat fingers 48A, 48B.

Bat 144 comprises segments 54 and 156. Segment 156 is similar to segment 56 described above except that segment 156 comprises an elongate tube having an interior 158 in which segment 54 is slidably disposed. Segment 156 carries finger 48B. Segment 156 telescopically slide relative to segment 54 from a first overlapping and retracted state shown in solid lines to a second overlapping an extended state shown in broken lines. The extension of segment 156 relative to segment 54 provides bat 144 with an extendable length. Adjusting the length of bat 144 may facilitate enhanced crop harvesting efficiency. Adjusting the length of bat 144 (and the positioning of their carried tines or fingers 148) may reduce crop gathering gaps along the length of the reel 120, reducing crop pileup at such gaps. Adjusting the length of bat 144 may further facilitate smoother crop flow and reduce crop loss.

Although bat 144 is illustrated with segment 156 receiving segment 54, in other implementations, this relationship may be reversed. In other implementations, segment 54 may comprise a hollow tube having an interior that slidably receives segment 156. With such an implementation, segment 54 may be provided with an increased size or diameter, providing segmented for increased strength for supporting the free end 157 of segment 156 which is cantilevered from segment 54.

Figure 3:
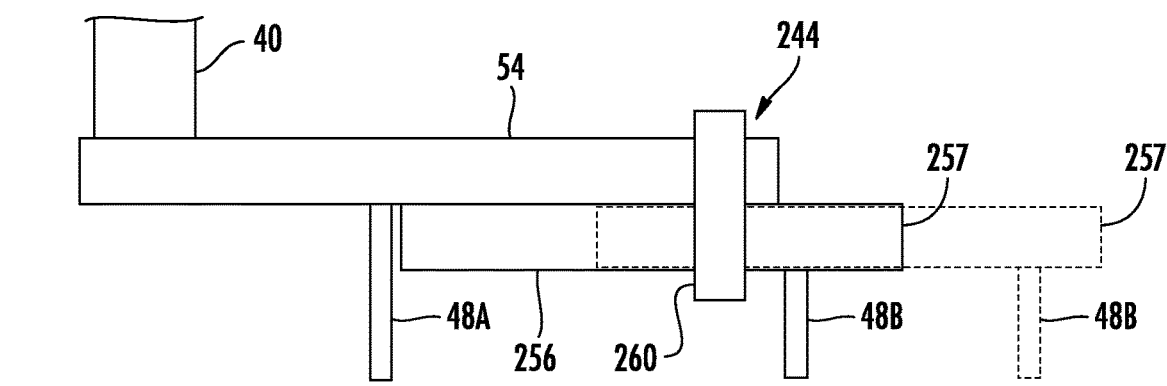
FIG. 3 is a schematic diagram of portions of another example harvester head reel, illustrating a bat in a retracted position and an extended position (shown in broken lines).

FIG. 3 schematically illustrates portions of an example harvester head reel 220 for use with a combine harvester or other similar harvesting device that employs a reel together crops. Harvester head reel 220 is similar to harvester head reel 20 described above except that harvester head reel 220 is specifically illustrated with bat 144 having two side-by-side segments that are retained alongside one another and that are not concentric. Harvester head reel 220 comprises bat support 40, extendable bat 244 and bat fingers 48A, 48B.

Bat 244 comprises segments 54, 256 and retainer 260. Segment 256 is similar to segment 56 described above except that segment 256 comprises an elongate rod or bar that extends on just one side or only partially about segment 54. Segment 256 carries finger 48B. in one implementation, segment 256 is a linear straight bar. In another implementation, segment 256 may at least partially curve about segment 54.

Retainer 260 guides sliding movement of segment 256 relative to segment 54 while retaining segment 256 alongside segment 54. In one implementation, retainer 60 may comprise a ring or bushing through which at least one of segments 54 and 256 slidably extend. In some implementation, the interior of retainer 26 may provide with a low friction surface such as polytetrafluoroethylene. In another implementation, retainer 260 may comprise a ring having internal bearings, such as ball bearings, to facilitate sliding movement. In one implementation, retainer 260 is fixed to segment 54 while segment 256 slides through retainer 260. In another implementation, retainer 2606 to segment 256 while 54 slide relative to retainer 260. In another implementation, both of segment 54, 256 slide relative to retainer 260.

Similar to bats 44 and 144, segment 256 moves relative to segment 54 from a first overlapping and retracted state shown in solid lines to a second overlapping an extended state shown in broken lines. The extension of segment 256 relative to segment 54 provides bat 244 with an extendable length. Adjusting the length of bat 244 may facilitate enhanced crop harvesting efficiency. Adjusting the length of bat 244 (and the positioning of their carried tines or fingers 148) may reduce crop gathering gaps along the length of the reel 220, reducing crop pileup at such gaps. Adjusting the length of bat 244 may further facilitate smoother crop flow and reduce crop loss.

Figure 4:
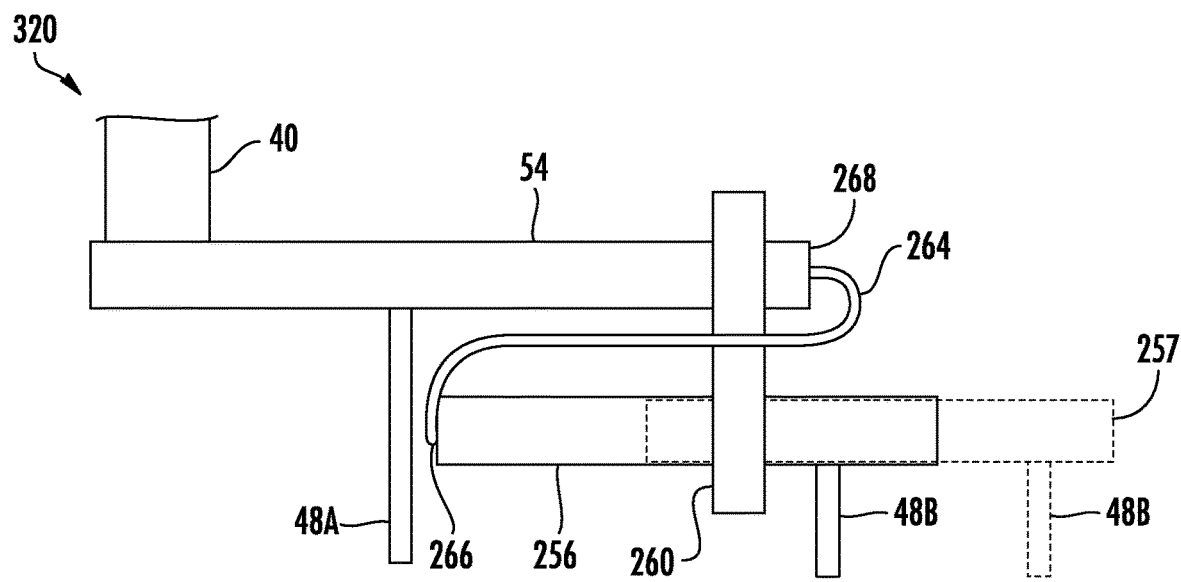
FIG. 4 is a schematic diagram of portions of another example harvester head reel, illustrating a bat in a retracted position and an extended position (shown in broken lines).

FIG. 4 schematically illustrates portions of an example harvester head reel 320 for use with a combine harvester or other similar harvesting device that employs a reel to gather crops. Harvester head reel 320 is similar to harvester head reel 220 described above except that harvester head reel 320 additionally comprises a flexible connector 264. Those remaining components of reel 320 which correspond harvester head reel 220 are numbered similarly.

Flexible connector 264 serves as a tether, connecting proximal end 266 of segment 256 to distal end 268 of segment 54. In one implementation, flexible connector 264 comprise a flexible strap or band. In one implementation, flexible connector 264 passes through retainer 260. In another implementation, flexible connector 264 may extend around the outside of retainer 260. Flexible connector 264 maintains connection and inhibits separation of segments 54 and 256.

Figure 5:
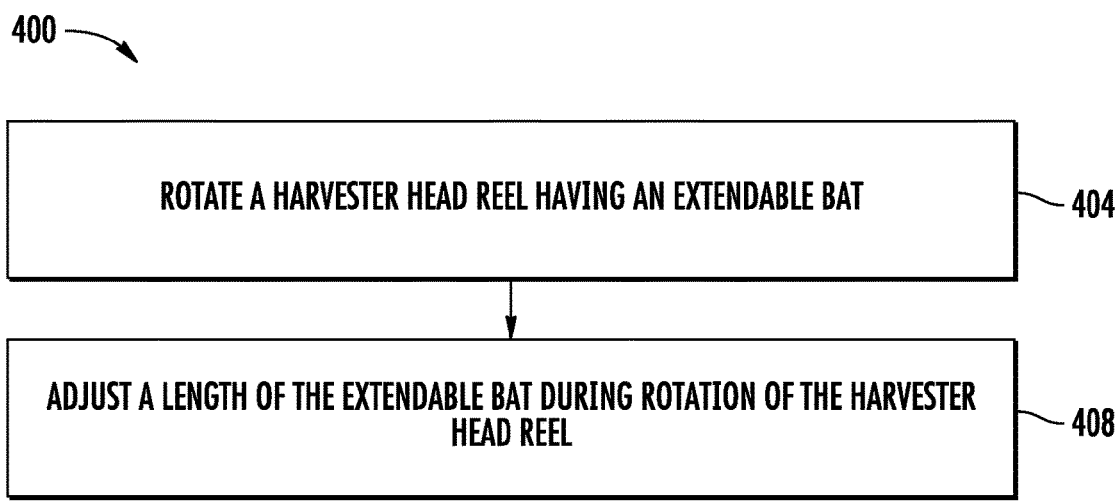
FIG. 5 is a flow diagram of an example crop harvesting method.

FIG. 5 is a flow diagram of an example method 400 for adjusting a harvester head reel. Method 400 may facilitate enhanced crop harvesting efficiency. Method 400 and may be carried out with any of the disclosed harvester head reel or similar harvester head reel.

As indicated by block 404, the harvester head reel having an extendable bat is rotated. As indicated by block 408, during rotation of the harvester head reel, a length of the extendable bat of the harvester head reel is adjusted. Adjusting the length of the bat and the positioning of its carried finger or fingers (also referred to as tines) may reduce crop gathering gaps along the length of the reel, reducing crop pileup at such gaps. Adjusting the length of the bats may further facilitate smoother crop flow and reduce crop loss.

Figure 6:
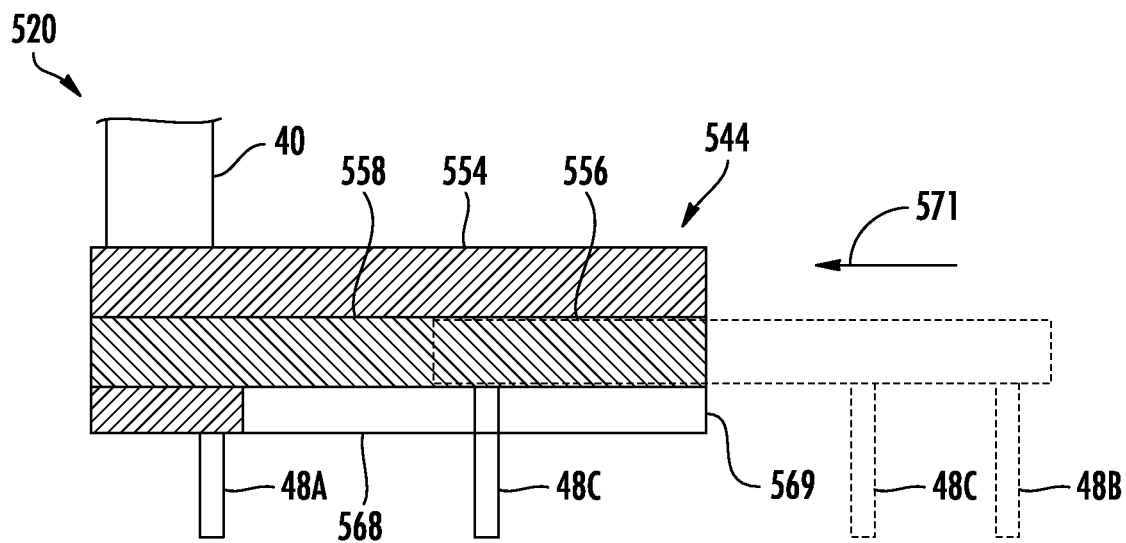
FIG. 6 is a sectional view of portions of another example harvester head reel, illustrating a bat in a retracted position and an extended position (shown in broken lines).
Figure 7:
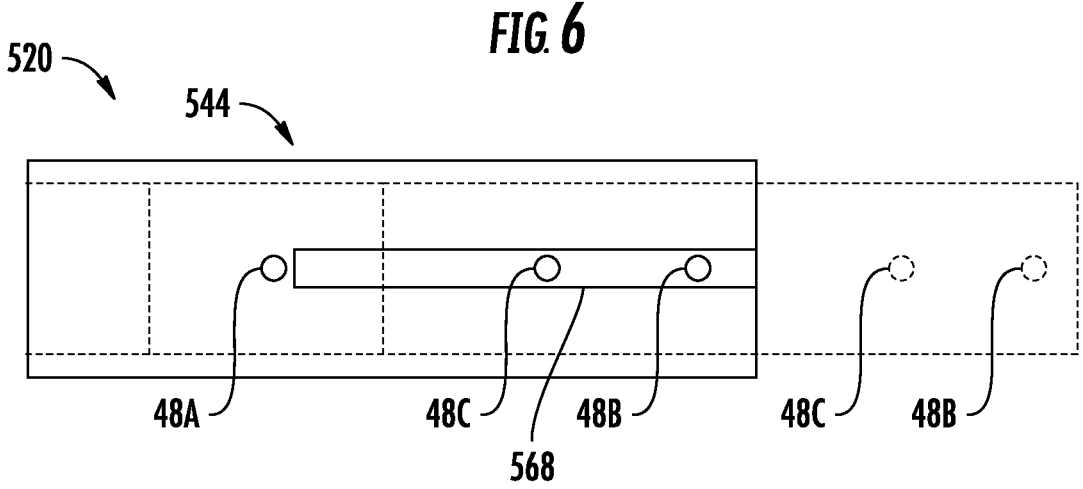
FIG. 7 is a bottom view of the example harvester head reel of FIG. 6.
Figure 8:
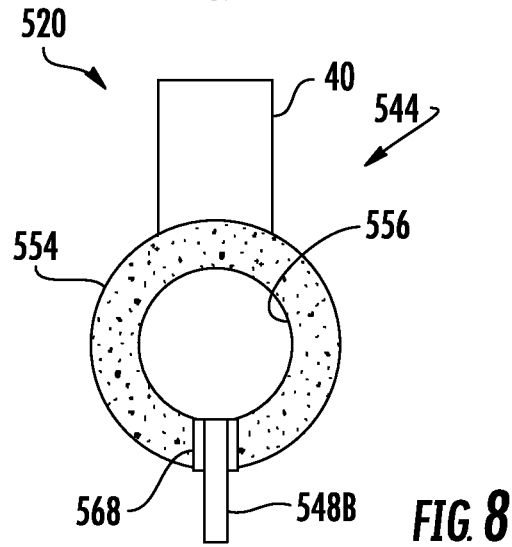
FIG. 8 is an end view of the example harvester head reel of FIG. 6.

FIGS. 6-8 illustrate portions of an example harvester head reel 520 for use with a combine harvester or other similar harvesting device that employs a reel to gather crops. Similar to harvester head reel 120, harvester head reel 520 utilizes a pair of telescopic concentric segments to provide a bat with an adjustable or extendable length. In contrast to harvester head reel 120, harvester head reel 520 comprises an extendable segment that is received within the other segment which is supported by that support 40. In addition to bat support 40, harvester head reel 520 comprises extendable bat 544 and fingers 48.

Bat 544 comprises at least two segments, such as segment 554 and segment 556. Segment 554 comprises an elongate tube supporting fingers 48A and having interior 558 which slidably receives segment 556. In one implementation, the interior 558 may comprise a low friction surface formed from a material such as nylon or polytetrafluoroethylene. In some implementations, bearings may be provided to interface between segment 556 and the interior segment 554.

As further shown by FIGS. 6-8, segment 554 additionally comprises an elongate slot 568 extending at least partially along its length and sized to slidably receive finger 48B. Slot 568 is in alignment with finger 548B such that finger 548B may slide within slot 568 as segment 556 is retracted such as from the extended position shown in dash-dash broken lines to the retracted position shown in broken lines. As a result, the retraction of the extendable segment 556 relative to segment 554 is not limited by the abutment of finger 548B against the distal end 569 of segment 554 as segment 556 is being retracted in the direction indicated by arrow 571. Instead, finger 548B enters the mouth of slot 568 and pass along the length of slot 568 until reaching the end of slot 568. Because the retraction of segment 556 into segment 54 is not limited by the positioning of finger 548B, segment 556 may be provided with a greater number of fingers 548 across a longer length or expanse of segment 556, segment 56 may be extended or retracted to a greater number of positions across a larger continuum and segment 556 may itself may be longer. For example, in some implementations, segment 556 may carry an additional finger 48C. Slot 568 provides a greater degree of flexibility and greater versatility for bat 544 and the fingers 48 carried by bat 544.

Figure 9:
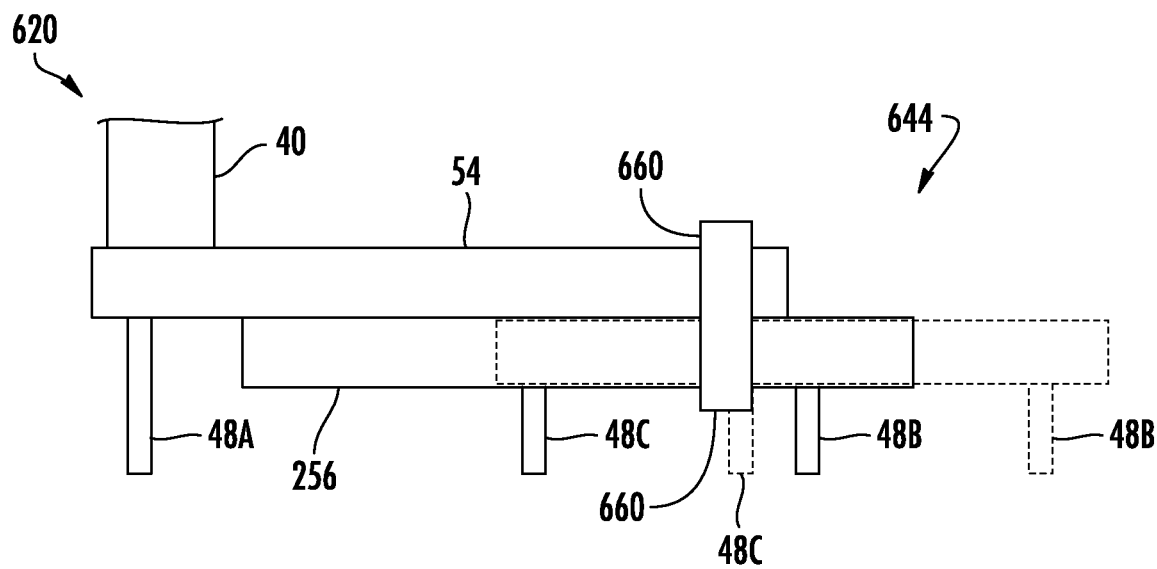
FIG. 9 is a side view of portions of another example harvester head reel, illustrating a bat in a retracted position and an extended position (shown in broken lines).
Figure 10:
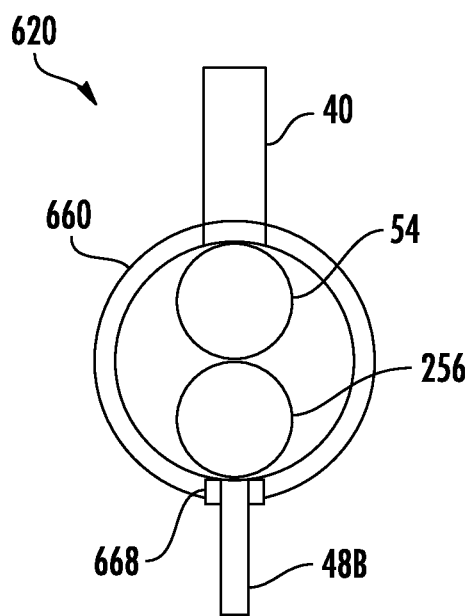
FIG. 10 is an end view of the harvester head reel of FIG. 9.

FIGS. 9 and 10 illustrate portions of an example harvester head reel 620 for use with a combine harvester or other similar harvesting device that employs a reel to gather crops. Similar to harvester head reel 220, harvester head reel 620 utilizes a pair of side-by-side non-concentric segments to provide a bat with an adjustable or extendable length. Similar to harvester head reel 220, harvester head reel 620 comprises a retainer 660 which slidably retains segments 54 and 256 relative to one another. Retainer 660 is similar to retainer 260 except that retainer 660 comprises a slot 668 through which fingers 48 may pass during extension or retraction of segment 256 relative to segment 54. Similar to slot 568, slot 668 provide a greater range for extension and retraction of segment 256 relative to segment 54. Slot 68 further facilitate the provision of additional fingers 48 at additional locations. As shown by FIG. 9, when segment 256 is in the retracted position or state, finger 48C is to the left of retainer 660. When segment 256 is in the extended position or state (shown in broken lines), finger 48C has passed at least partially through or across retainer 660 so as to extend within or to the right of retainer 660.

Figure 11:
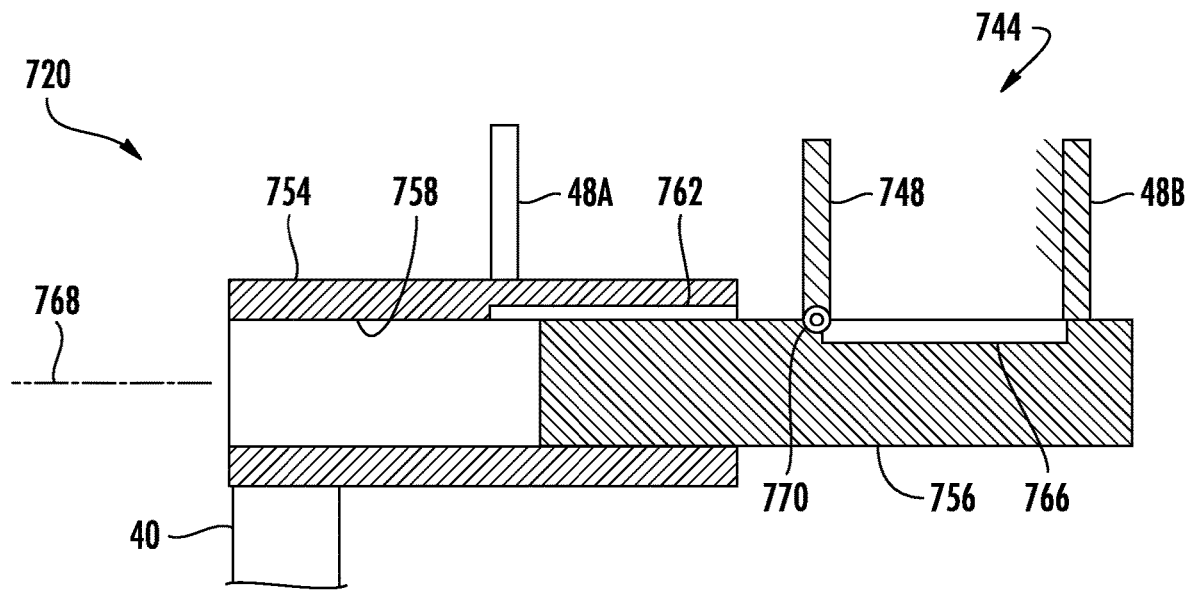
FIG. 11 is a sectional view of another example harvester head reel, illustrating an example bat in an extended position.
Figure 12:
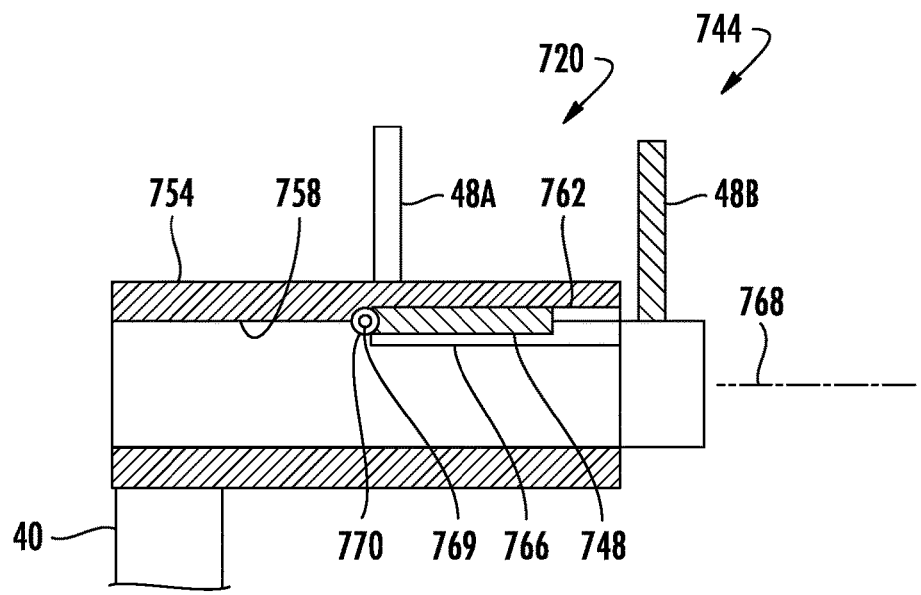
FIG. 12 is a sectional view of the example harvester head reel of FIG. 11, illustrating the example bat in a retracted position.

FIGS. 11 and 12 schematically illustrate portions of an example harvester head reel 720. Harvester head reel 720 is similar to harvester head reel 520 described above except that harvester head reel 720 comprises extendable bat 744. Bat 744 is similar to bat 544 described above except that instead of passing a finger, such as finger 48C through and along a slot during retraction of the outermost segment, bats 744 utilize a collapsible or pivoting finger 748 that collapses or pivots into a space between the segments during telescopic retraction of the segments.

Bats 744 comprises segment 754 and segment 756. Segment 754 comprises an elongate tube having interior 758 slidably receives segment 756. Interior 758 comprises an axial channel or groove 762 for at least partially receiving finger 748 when finger 748 is collapsed and is extending between segments 754 and 756. Segment 754 is connected to bat support 40 and supports finger 48A.

Segment 756 is slidably received within segment 754 and supports finger fingers 48B and 748. In the example illustrated, segment 756 comprises an axial channel or groove 766 four at least partially receiving finger 748 when finger 748 is collapsed and is extending between segment 754 and 756. In some implementations, depending upon the thickness or collapsability of finger 748 or the spacing between the outer circumferential services of segment 756 and the inner circumferential surfaces of segment 754, one or both of grooves 762, 766 may be omitted. In some implementations, the finger 48B carried by segment 756 may be omitted.

Finger 748 outwardly or radially projects from segment 756. Finger 748, sometimes referred to as a tine, engages and gathers crop as reel 720 is being rotated. Finger 748 is pivotable from the extended position or state shown in FIG. 11 in which finger 748 extends substantially perpendicular to the axis 768 of bat 744 to the collapsed state shown in FIG. 12 in which finger 748 extends substantially parallel to the axis 768 of bats 744. In one implementation, finger 748 is pinned to segment 756 for pivotal movement about axis 769, wherein a torsion spring 770 having one end secured to segment 756 and a second end secured to finger 748 resiliently biases finger 748 towards the extended position shown in FIG. 11. During retraction of segment 756 into interior 758 of segment 754, finger 748 is pivoted against the bias of the torsion spring 770 to the inset in collapsed state shown in FIG. 12. In another implementation, at least lower portions of finger 748 may be formed from a resiliently flexible material that permits finger 7482B resiliently bent from the extended position shown in FIG. 11 to the collapsed or retracted position shown in FIG. 12. In one implementation, the bendability or foldability of finger 748 is limited to the direction about axis 769, wherein bendability or foldability about axis 768 is limited or restricted.

As shown by FIG. 12, the collapsible nature of finger 748 facilitates greater telescopic reception of segment 756 by segment 754. As a result, segment 756 may carry finger 748 without substantially limiting the degree or extent to which segments 756 is telescopically receivable within segment 754. As a result, segment 756 may have a greater length. The greater potential length of segment 756, the greater intractability of segment 756 and the additional fingers that may be supported by segment 756 may offer bat 744 with greater versatility.

Figure 13:
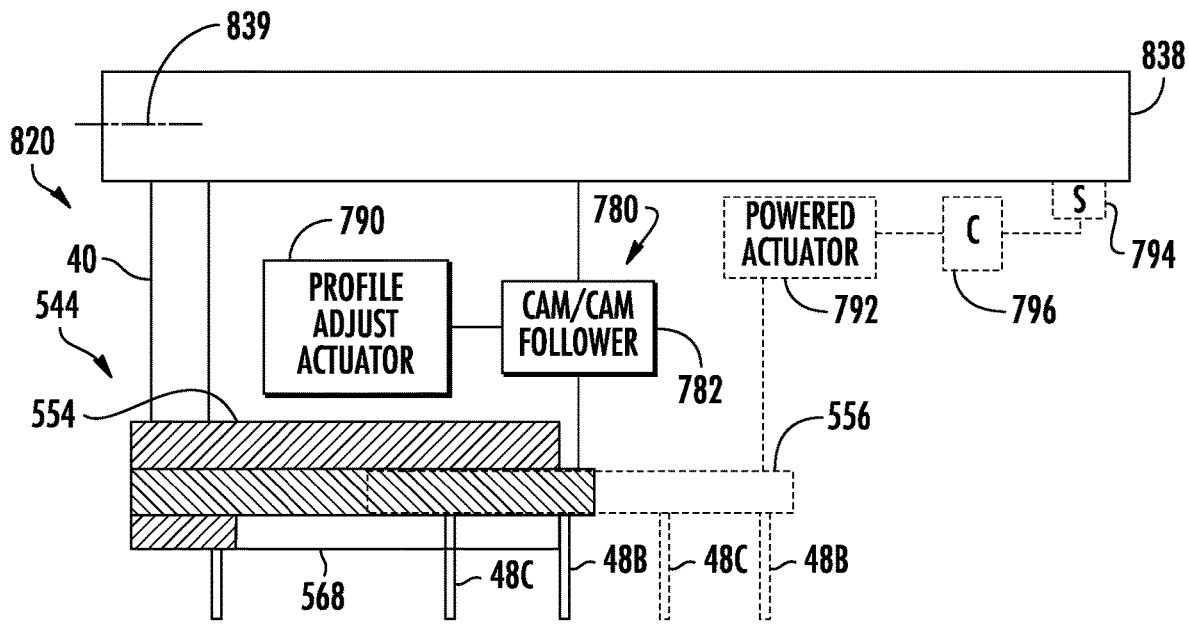
FIG. 13 is a sectional view of another example harvester head reel, illustrating a bat in a retracted position and an extended position (shown in broken lines).

FIG. 13 schematically illustrates portions of harvester head reel 820. Harvester head reel 820 is similar to harvester head reel 520 described above except that harvester head reel 820 is illustrated as additionally comprising reel hub 838 and bat actuator 780. Those remaining components of reel 820 which correspond to components of reel 520 are numbered similarly.

Reel hub 83 comprises an elongate tube or shaft. Reel hub 838 supports bat support 40 and is to be rotatably driven about its axis 839. Reel hub 838 may support multiple bat supports 40 which support multiple bats 544 at circumferentially spaced positions angularly about hub 838 and axis 839.

Bat actuator 780 comprise an actuator coupled between hub 838 and segment 556 of bat 544 that moves segment 556 between the retracted state shown in solid lines and the extended ship state shown in broken lines. In one implementation, bat actuator 780 comprises a cam and corresponding interacting cam follower mechanism 782 operably coupled between segment 556 and hub 838. In one implementation, a cam is coupled to are carried by hub 838 to rotate with hub 838, while a cam follower is connected to segment 556, wherein the cam drives the cam follower based upon the angular positioning of the cam about axis 839 as hub 838 is rotated.

The cam drives the cam follower so as to controllably extend and retract segment 556 relative to segment 554 during rotation of hub 838 and reel 820 based upon the angular positioning of bat 544 about axis 839. The cam drives the cam follower so as to controllably extend and retract segment 556 in accordance with an extension-retraction profile. For example, when bat 544 is at a first angular position about axis 839, such as forward of hub 838, the cam may position the cam follower such that segment 556 is at a fully extended state. When bat 544 is at a second different angular position with respect to axis 839, such as above hub 838, the cam may position cam follower such that segment 556 is that a partially extended state. When bat 544 is at a third different angular position with respect to axis 839, such as rearward of hub 838, the cam a position the cam follower such as the segment 556 is at a fully retracted position or state with respect to segment 554. Such a profile may be smooth and continuous based upon the continuously changing angular position of bat 544 as hub 838 is rotated.

In some implementations, actuator 780 may additionally comprise a profile adjust actuator 790 which adjusts the angle or positioning of the cam. Actuator 790 allows a profile for the extension and retraction of segment 556 (and the changing length of bat 544) to be adjusted by the operator depending upon harvesting conditions or the particular crop being harvested. In one implementation, actuator 790 comprises a manual actuator, such as a manual lever to facilitate the selective repositioning of the cam relative to the cam follower or relative to hub 838. In yet another implementation, actuator 790 may comprise a powered actuator such as an electric solenoid, a hydraulic or pneumatic cylinder-piston assembly or the like, wherein an operator may remotely enter commands to a controller which outputs control signals that are transmitted to the actuator 790 to adjust the extension and retraction profile for bat 544.

As shown by broken lines, in other implementations, extension and retraction of segment 556 may be carried out with a powered actuator. In such an implementation, harvester head reel 820 may comprise powered actuator 792, sensor 794 and controller 796. Powered actuator 792 is operably coupled to segment 556 and extends and retracts segment 556 in response to control signals received from controller 796. For example, electric solenoid may have one and connected segment 554 and a second and connected to segment 556. In one implementation, powered actuator 792 may comprise an electric solenoid coupled to segment 556. In another implementation, powered actuator 792 may comprise a hydraulic or pneumatic cylinder other actuation mechanism.

Sensors 794 comprises sensor that outputs signals indicating the angular positioning of bat 544 about axis 839. In one implementation, sensor 794 senses outputs signals indicating the angular positioning of bat 544 based upon the angular positioning of hub 838. In one implementation, sensor 794 is coupled to are carried by hub 838. In another implementation, sensor 794 is coupled to are carried by bat 544. For example, in one implementation, sensor 794 may comprise a gyroscope and/or an accelerometer which communicates in a wired or wireless fashion with controller 796.

Controller 796 comprises a processing unit that follows instructions in a non-transitory computer readable medium so as to adjust a length of bat 544 (and potentially other bats 544 supported about hub 838) during rotation of reel 820 based on angular position of each of the individual bats about axis 839. In such an implementation, controller 796 may comprise a non-transitory computer readable medium which contains or stores different extension and retraction profiles. In one operational mode, controller 796 may switch from one extension-retraction profile to another extension-retraction profile in response to receiving user input commands or selections. In another operational mode, controller 796 may automatically switch from one extension-retraction profile to another extension-retraction profile in response to various sensed parameters. Examples of such sensed parameters which may trigger (based upon a predefined threshold being satisfied) such switching to a different extension-retraction profile include, but are not limited to, sensed (or input) crop type, sensed crop yield, sensed crop moisture, sensed crop loss, head height, head angular positioning, pitch of the head or harvester, roll of the head or harvester, angular position of individual reel or head sections relative to one another, and the like.

Figure 14:
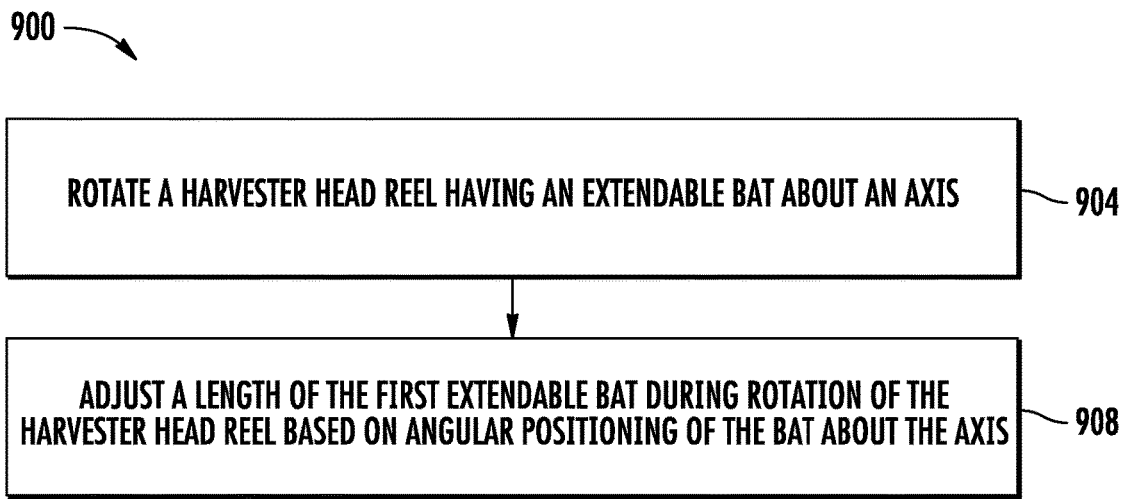
FIG. 14 is a flow diagram of an example crop harvesting method.

FIG. 14 is a flow diagram illustrating an example crop harvesting method 900. Although method 900 is described as being carried out in the context of harvester head reel 820, method 900 may likewise be carried out with any of the extendable bats and harvester head reels described in this disclosure or similarly configured harvester head reels and bats. Likewise, although system 820 is illustrated as having bat 544, it should be appreciated that the actuator 780 and profile adjust actuator 790 or actuator 792 along with sensors 794 and controller 796 may additionally be utilized to control the extension and retraction of any of the other extendable and retractable bats described in this disclosure.

As indicated by block 904 in FIG. 14, harvester head reel 820, with its extendable bat 544, is rotated about an axis 839. As indicated by block 908, the length of bat 544 is adjusted during rotation of harvester head reel 820 based upon angular positioning of bat 544 about axis 839. Such adjustment of the carried out automatically such as with actuator 780 or with powered actuator 792 based upon control signals received from controller 796 which are in turn based upon signals from sensor 794.

Figure 15:
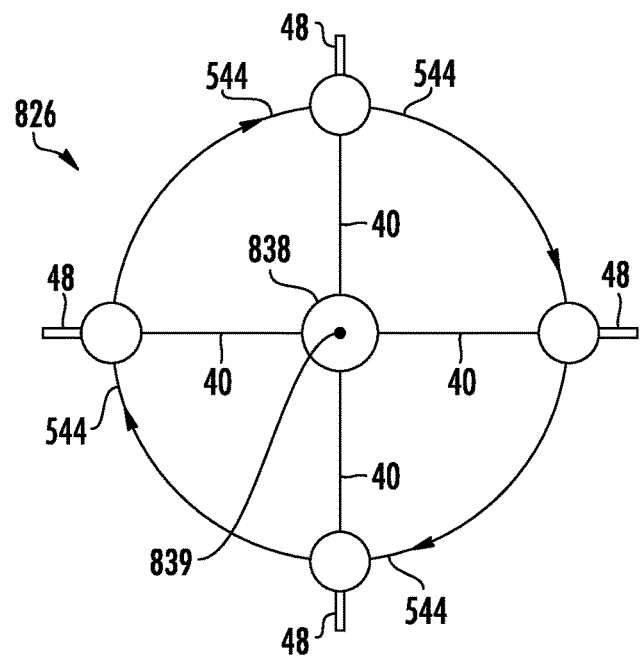
FIG. 15 is an end view of portions of the example harvester head reel of FIG. 13 illustrating different angular positions of the bat about a hub of the reel.

FIG. 15 is an end view schematically illustrating harvester head reel 820 with bat 544 shown in various angular positions about a respect to axis 839. In accordance with method 900 and accordance is one example extension-retraction profile, when bat 544 is at the 3 o'clock position, bat 544 may have a first length with the end most segment 556 extending from segment 554 by a first distance. When bat 544 is that the 9 o'clock position, bat 544 may have a second length less than the first length with the end most segment 556 retracted completely into segment 554 or extending from segment 554 by second distance less than the first distance. When bat 544 is that the 6 o'clock position of the 12 o'clock position, that 554 may have a third length less than the first length greater than the second length, wherein the end most segment 556 extends from segment 554 by a third distance less than the first distance but greater than the second distance. In another implementation, other extension-retraction profiles may be utilized in method 900. As discussed above, in some implementations, the extension-retraction profile may, in some implementations, be manually or automatically adjusted based upon any of the above described parameters.

Figure 16:
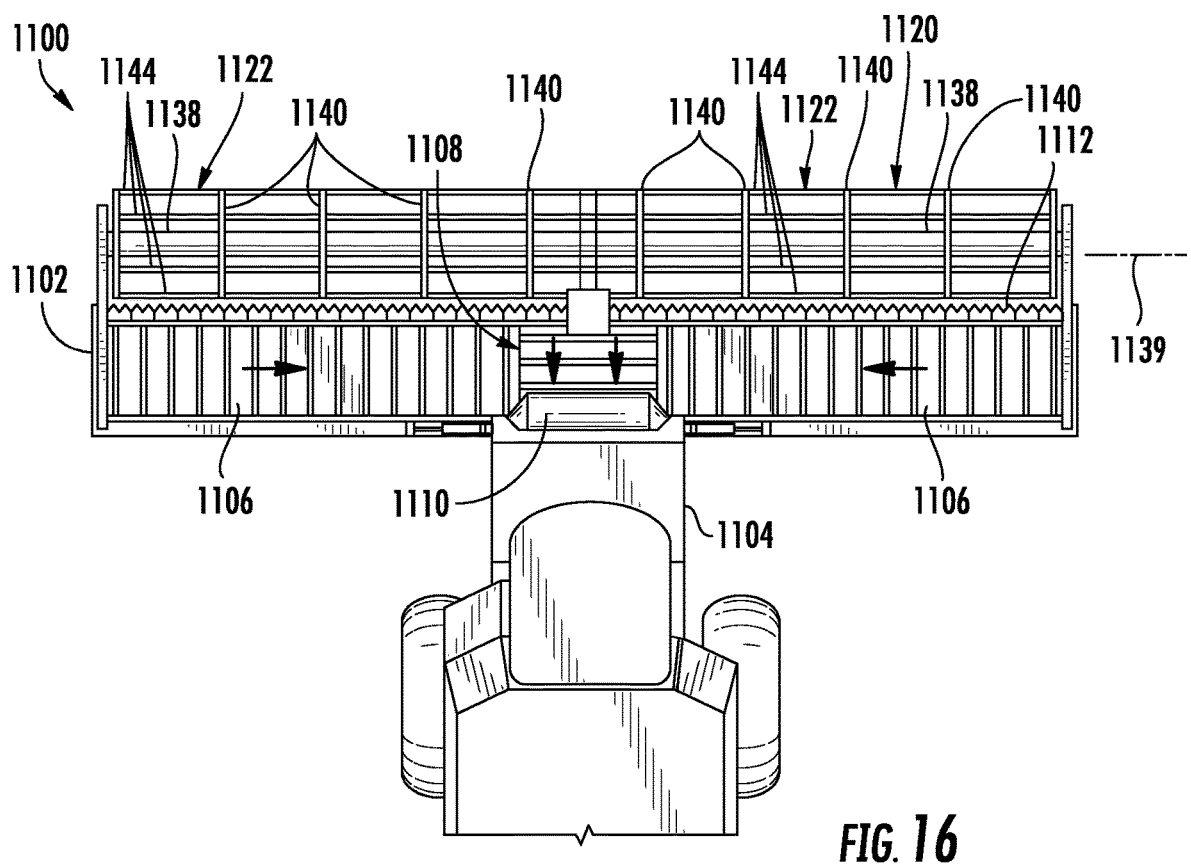
FIG. 16 is a top view illustrating portions of an example combine harvester including an example harvester head reel with extendable bats.

FIG. 16 is a top view of a front portion of an example combine harvester 1100 having a head 1102 provided with a harvester head reel having bats is adjustable lengths. Another example of a harvester head reel that may utilize a harvester head reel having bats with adjustable lengths is described in co-pending U.S. patent application Ser. No. 13/017,589 filed on Jan. 31, 2011 by Coers et al and entitled "Flexible Cutting Platform to Follow Ground Contour in an Agricultural Harvesting Machine", the full disclosure of which is hereby incorporated by reference.

As shown by FIG. 4, harvester 1100 comprises a feeder housing 1104 which is detachably coupled with head 1102. Feeder housing 1104 receives the crop material from head 1102, both grain and non-grain crop material, and transports the crop material to a separator within harvester 1100. The grain crop material is separated from the non-grain crop material, cleaned and transported to a grain tank. The non-grain crop material is transported to a chopper, blower, etc. and distributed back to the field.

Head 1102 generally includes a plurality of side platform sections 1106, a central feed section 1108, a feed drum 1110, a cutter assembly 1112 and a reel 1120. Side platform sections 1106 extend on opposite sides of central feed section 1108. In the example illustrated, side platform sections 1106 each comprise a draper belt which carries crop material to central feed section 1108. Central feed section 1108 comprises a central belt that carries crop material to feed drum 1110. Feed drum 1110 transports the crop material into feeder house 1104 described above. In other implementations, side platform sections 1106 may additionally or alternatively include augers for conveying crop material laterally to central feed section 1108.

Cutter assembly 1112 and reel 1120 cooperate to separate the crop from the underlying growing media and to move the severed crops on to platform sections 1106 and 1108. Cutter assembly 1112 may comprise a transversely reciprocating cutter bar which severs the crop. In one implementation, head 1102 may comprise a pair of cutter assembly sections, one section for each of side platform sections 1106.

Reel 1120 rotates about axis 1139 to move growing crops towards cutter assembly 1112 and to further move the then severed crops on to sections 1106, 1108. In the example illustrated, reel 1120 comprises two reel sections 1122 extending along side platform sections 1106. Each reel section 1122 comprises a hub 1138, a plurality of bat supports 1140 and a plurality of individually and differentially extendable bats 1144 which support fingers 1148 (shown in FIG. 17).

Figure 17:
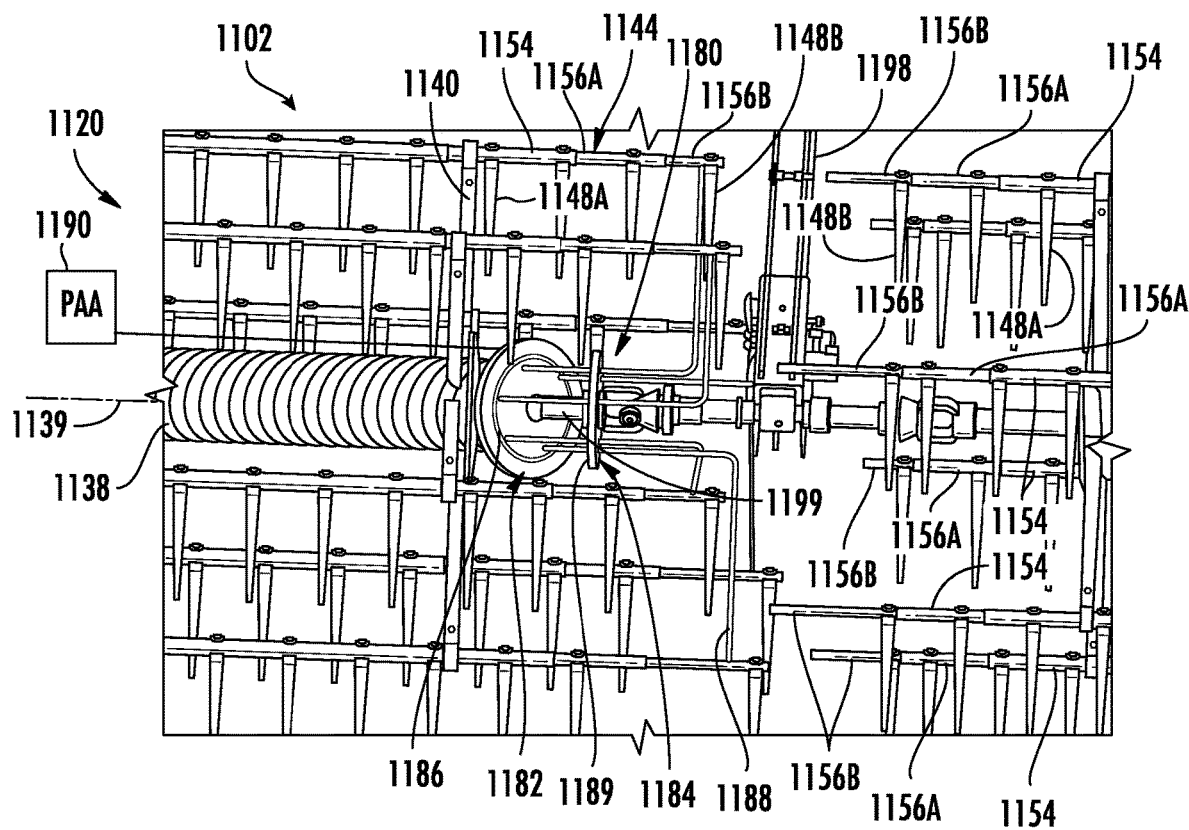
FIG. 17 is a front view illustrating portions of the example harvester head reel of FIG. 16.

FIG. 17 illustrates portions of harvester head reel 1120 in more detail. As shown by FIG. 17, harvester head reel 1120 comprises hub 1138, bat supports 1140, extendable bats 1144, fingers 1148A, 1148B (collectively referred to as fingers 1148) and actuator 1180. Hub 1138 is similar to hub 838 described above. Hub 1138 is operably coupled to a rotary drive for rotation of hub 1138 about axis 1139. Bat supports 1140 are fixed to and radially extend from hub 1138. Bat supports 1140 support extendable bats 1144 at radially and angularly spaced positions about axis 1139. In one implementation, bat supports 1140 are provided by a star disk having spokes sporting each extendable bat 1144. In other implementations, bat supports 1140 may have other configurations.

Extendable bats 1144 are circumferentially located at angularly spaced positions about hub 1138. Each of extendable bat 1144 has an extendable and retractable length. In the example illustrated, each of extendable bats 1144 is similar to extendable bat 544 described above in that the extendable segments are telescopically received within one another. Each of extendable bats 1144 comprises segments 1154 and extendable-retractable segments 1156A, 1156B (collectively referred to as segments 1156) which are similar to segments 554 and 556 described above. Segments 1154 and 1156 each carry at least one finger 1148. In the example illustrated, each of segments 1154 carries a tine or finger 1148A while each of segments 1156A and 1156 carries a tine or finger 1148B. in the example illustrated, segment 1156A is telescopically received within segment 1154 while segment 1156B is telescopically received within segment 1156A.

Figure 17A:
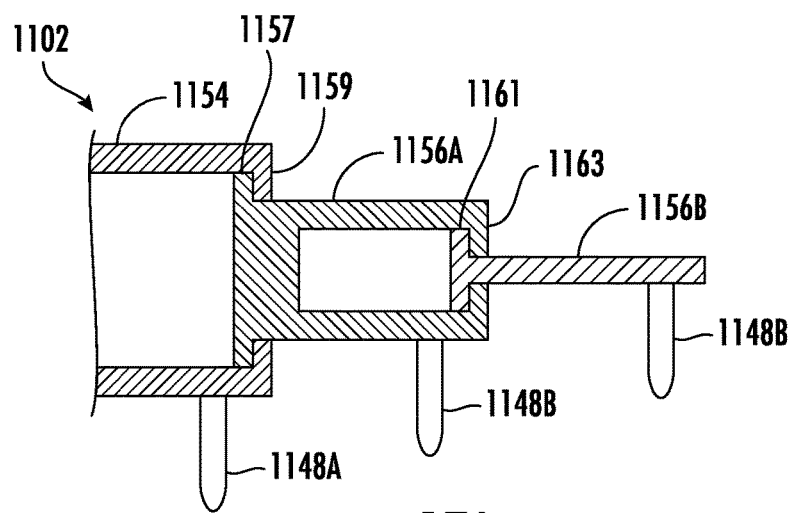
FIG. 17A is a sectional view of portions of the harvester head reel of FIG. 17, illustrating example consecutive extendable segments of an extendable bat in fully extended states

In one implementation, each of segments 1156B has an a proximal end captured and retained within the receiving segment 1156A such that segments 1156B cannot be fully withdrawn from the receiving segment 1156A and such that following the full extension of segment 1156B, further outward movement of segment 1156B results in segment 1156B pulling segment 1156A outward from segment 1154. For example, shown by FIG. 17A, in one implementation, segment 1156A has an annular shoulder 1157 that abuts against an annular stop 1159 of segment 1154 to limit withdrawal of segment 1156A from segment 1154. Similarly, segment 1156B has an annular shoulder 1161 that abuts against an annular stop 1163 of segment 1156A to limit withdrawal of segment 1156B from segment 1156A. Upon full extension of segment 1156B, segment 1156B may begin pulling segment 1156A from segment 1154. Upon complete retraction of segment 1156B, finger 1148B of segment 1156B may engage the distal end of segment 1156A or the proximal end of a slot extending through segment 1156A (when provided) and receiving FIG. 1148B of segment 1156B to then begin pushing segment 1156A into segment 1154.

In one implementation, each of segments 1156 supports a single finger 1148, wherein the two fingers supported by segments 1156A and 1156B are spaced by a maximum distance of less than or equal to 200 mm (approximately 8 inches) when segment 1156B is fully extended out of or away from segment 1156A. Likewise, the finger 1148B supported by segment 1156A is spaced from the closest finger supported by segment 1154 by a maximum distance of less than or equal to 200 millimeters when segment 1156A is fully extended out or away from segment 1154. In such an implementation, the two telescopic segments 1156 provide a total maximum extendable length of 400 mm. It has been found that a maximum spacing of 200 mm between consecutive fingers provides enhanced crop gathering efficiencies. However, in other implementations, this length of the segments and the relative positioning of their fingers may have other values.

Segments 1156 are each telescopically received within and slidable between an extended position or state and a retracted position or state. In one implementation, each of segments 1154 and 1156A further includes a slot 568 (shown in FIGS. 6-8) facilitating greater overlapping between segments 1154 and 1156 without interference from fingers 1148. In other implementations, such slots may be omitted. In other implementations, each of extendable bats 1144 may alternatively be similar to any of the other extendable bat described as respect to FIGS. 1-4 and 9-12.

Actuator 1180 is similar to actuator 780 in that actuator 1180 is a cam-cam follower arrangement to selectively extend and retract segments 1156 relative to segments 1154 based upon an extension-retraction profile. Actuator 1180 comprises cam 1182 and cam follower 1184. Cam 1182 is coupled central feed arm 1198 by shaft 1199. Hub 1138 rotates about axis 1139 while cam 1182 is held stationary about axis 1139. In the example illustrated, cam 1182 comprises a swash plate having a circular groove 1186. The swash plate of cam 1182 extends in a plane that is supported at an angle that is oblique to axis 1139. The angle of swash plate of cam 1182 defines the extension-retraction profile of bats 1144.

Cam follower 1184 comprises cam follower rods 1188 and stabilizer guide 1189. Cam follower rods 1188 comprise elongate rods shaped so as to have a first end received within the groove 1186 and a second end connected to a respective one of segments 1156B. In the example illustrated, each of rods 1188 slidably passes through corresponding apertures through stabilizer guide 1189. Stabilizer guide 1189 stabilizes and guide sliding movement of rods 1188 as they move leftward and rightward in response to rotation of hub 1138. Stabilizer guide 1189 rotates about axis 1139 in unison with the rotation of hub 1138 about axis 1139. As bats 1144 are rotated about axis 1139, cam followers 1188 ride or slide along groove 1186, extending and retracting segments 1156 in accordance with the extension-retraction profile defined by cam 1182. During retraction of segments 1156, retraction of segment 1156B results in segment 1156B pushing upon segment 1156A further into segment 1154. During extension of segments 1156, extension of segment 1156B results in segment 1156B outwardly pulling segment 1156A from segment 1154.

As schematically shown in FIG. 17, in one implementation, harvester head reel 1120 may additionally comprise a profile adjust actuator (PAA) 1190. In such an implementation, cam 1182 may be mounted on bearings or other structures which facilitate pivoting of the swash plate forming cam 1182 between different angles that are each oblique to axis 1139. In such an implementation, profile adjust actuator 1190 may comprise an actuator that repositions cam 1182 at a selected one of a plurality of different available angles to provide a selected one of a plurality of different extension-retraction profiles for bats 1144. In such an implementation, profile adjust actuator 1190 may comprise a powered actuator, such as an electric solenoid or hydraulic/pneumatic cylinder-piston assembly which operates in response to control signals output by a controller, wherein the control signals are based upon a selected one of the extension-retraction profiles stored in a non-transitory computer-readable medium.

In one implementation, profile adjust actuator 1190 may automatically actuate cam 1182 between different oblique angles to thereby provide a selected extension and retraction profile based upon and in response to Figures sensed parameters. Examples of such sensed parameters which may trigger such switching (based upon a predefined threshold being satisfied) to a different extension-retraction profile including, but are not limited to, sensed (or input) crop type, sensed crop yield, sensed crop moisture, sensed crop loss, head height, head angular positioning, pitch of the head or harvester, role of the head or harvester, angular position of individual reel or head sections relative to one another, and the like.

Figure 18:
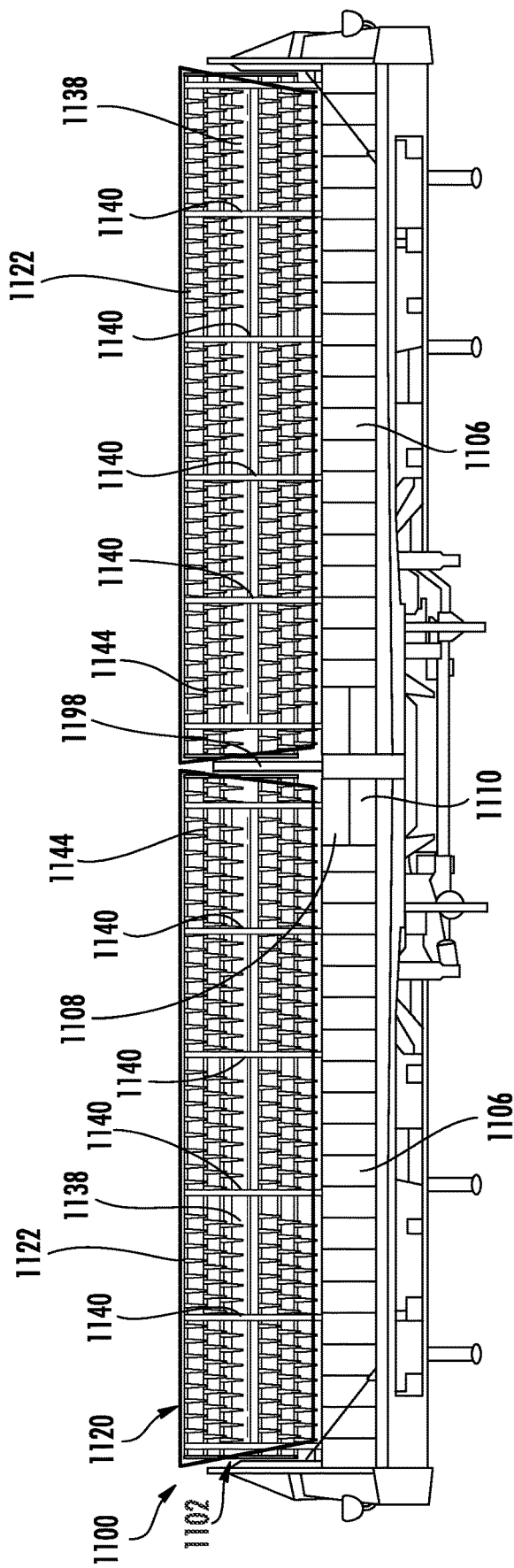
FIG. 18 is a top view of the harvester head of FIG. 16 illustrating actuation of the extendable bats in accordance with a first extension-retraction profile.
Figure 19:
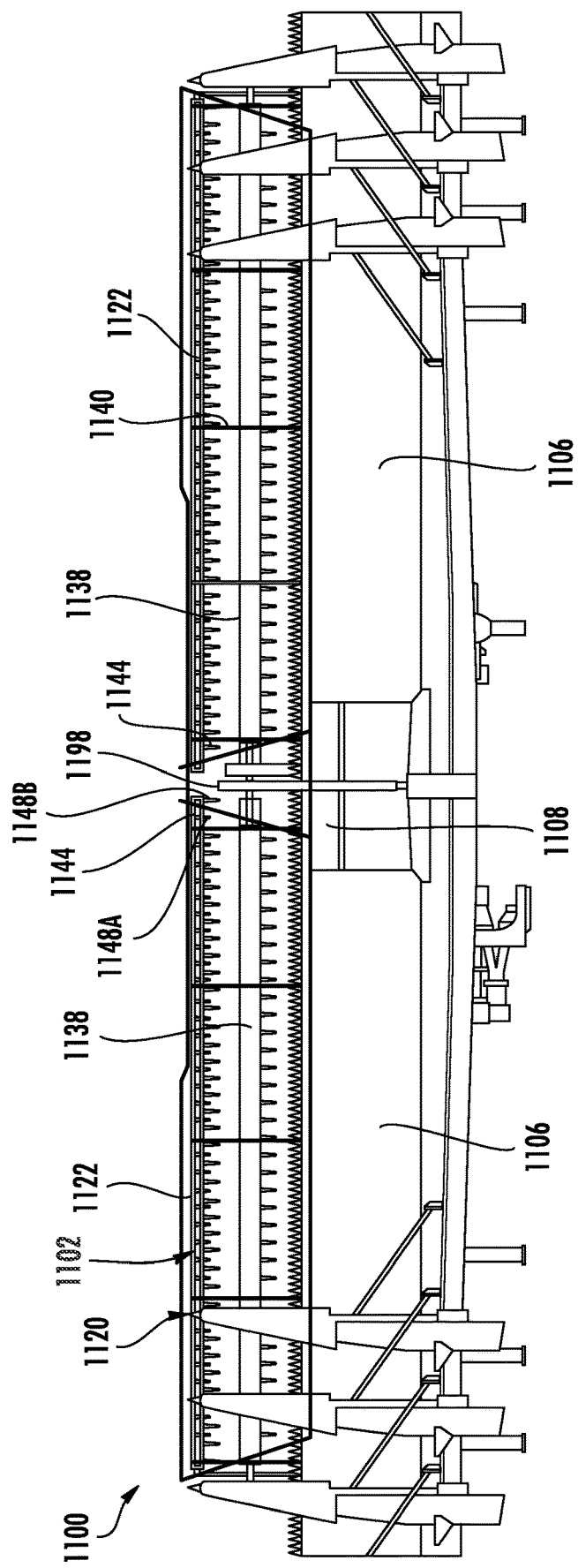
FIG. 19 is a bottom view of portions of the example harvester head reel of FIG. 16 illustrating actuation of the extendable bats in accordance with a second extension-retraction profile.

FIGS. 18 and 19 are top and bottom views, respectively, of a harvester head 1102, illustrating actuator 1180 of reel 1120 actuating bats 1144 in accordance with two example extension-retraction profiles during rotation of reel 1120. During such rotation of reel 1120, actuator 1180 extends each bat 1144 towards and, in some implementations, in front of the central reel arm 1198, when the particular bat 1144 is at in front of hub 1138 (distal feeder house 1104 shown in FIG. 16). In particular, actuator 1180 further extends segment 1156 from segment 1154. During such rotation of reel 1120, actuator 1180 retracts each bat 1144 in directions away from central feed arm 1198, when the particular bat 1144 is at a rear of hub 1138 (proximate feeder house 1104 shown in FIG. 16). In particular, actuator 1180 further retracts segment 1156 into segment 1154. As shown by FIGS. 18 and 19, the extent to which segment 1156 extends from or is retracted into segment 1154 may be varied based upon the angle of cam 1182. As shown by FIGS. 18 and 19, the example extension and retraction profiles have trapezoidal shapes when viewed from above. In other implementations, the extension-retraction profiles may have other shapes such as a rhomboid or rectangular shape when viewed from above.

Figure 20:
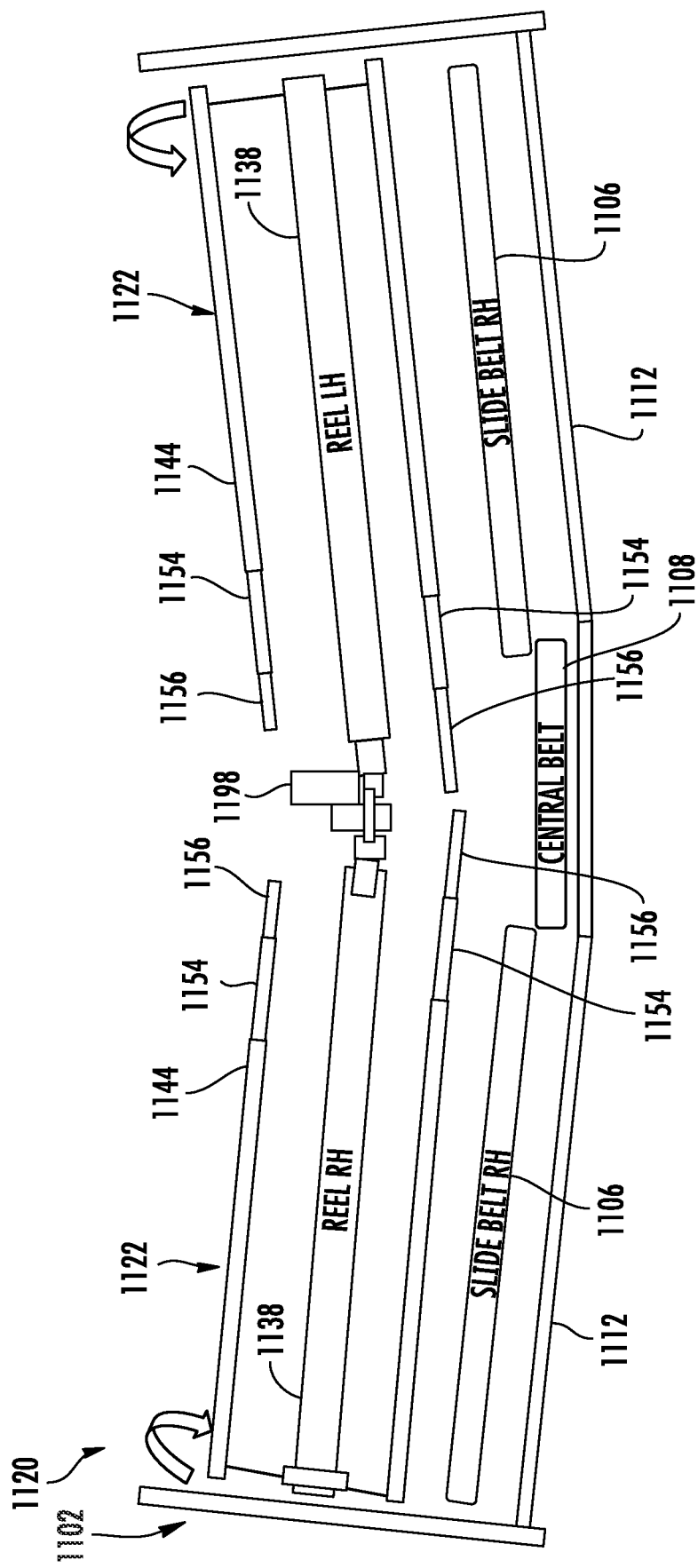
FIG. 20 is a front view of portions of the harvester head of FIG. 16 illustrating actuation of the extendable bats in accordance with a third extension-retraction profile.

FIG. 20 schematically illustrates portions of the example harvester head reel 1120 from a front of harvester head reel 1120 during extension and retraction of bats 1144 pursuant to a different extension-retraction profile. For ease of illustration, actuator 1180 and fingers 1148 are omitted. FIG. 20 illustrates reel 1120 when the side platform sections 1106 and the corresponding cutter bar sections 1122 are inclined to accommodate changes in terrain. In the example illustrated, sections 1106 upwardly inclined as they extend away from central feed section 1108. The two reel sections 1122 likewise angle upwardly or incline upwardly as they extend away from central reel support arm 1198.

To accommodate this upward inclination of reel sections 1122 cam 1182 is positioned by profile adjust actuator 1190 so as to face in an upward and inward direction towards center reel support arm 1198. This results in bats 1144 having the extension-retraction profile illustrated where bats 1144 have a large degree of extension when below hub 1138 and the largest degree of retraction when above hub 1138. In other words, segments 1156 has a large degree of extension from segment 1154, inwards towards center reel arm 1198, when angularly positioned below hub 1138. Segments 1156 have the smallest degree of extension from (or greatest degree of retraction into) segments 1154 when angularly positioned above hub 1138. As a result, the extension retraction of bats 1144 accommodates the otherwise larger gap between reel sections 1122 below arm 1198 and the otherwise smaller gap between reel sections 1122 above arm 1198 due to such upward and outward angling of reel sections 1122. By addressing the changes in the gaps between reel sections 1122, reel 1120 may provide smoother crop flow and reduced crop loss.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
a harvester head reel comprising:
bat support;
an extendable bat supported by the bat support, the extendable bat having a first segment and a second segment overlapping the first segment;
a first finger extending from the first segment;
a second finger extending from the second segment; and
an actuator to extend and retract the second segment relative to the first segment based upon an angular position of the bat about a longitudinal axis of the reel as the bat rotates about the longitudinal axis of the reel.

2. The apparatus of claim 1, wherein the second segment telescopes into and from the first segment.

3. The apparatus of claim 1, wherein the second segment is slidable along an exterior of the first segment.

4. The apparatus of claim 3, comprising a sleeve guiding sliding movement of the second segment parallel to the first segment.

5. The apparatus of claim 3, wherein the second segment is connected to the first segment by a flexible connector.

6. The apparatus of claim 1, wherein the bat further comprises a third segment overlapping the second segment.

7. The apparatus of claim 1, wherein one of the first segment and the second segment comprises a slot, wherein one of the first finger and the second finger is slidable into and along the slot.

8. The apparatus of claim 1, wherein one of the first finger and the second finger is collapsible so as to be receivable within one of the first segment and the second segment.

9. The apparatus of claim 1, wherein the second segment has a length of less than or equal to 200 mm.

10. The apparatus of claim 1, wherein the actuator comprises:
   a stationary cam; and
   a cam follower coupled to the second segment and in engagement with the cam, wherein rotation of the second segment about the longitudinal axis of the reel moves the cam follower to extend and retract the second segment relative to the first segment based upon the angular position of the bat about the longitudinal axis of the reel.

11. The apparatus of claim 10 further comprising a second actuator operably coupled to the cam so as to selectively adjust an angle of the cam relative to the longitudinal axis of the reel.

12. The apparatus of claim 11 further comprising a sensor to output signals based upon a sensed parameter, wherein the second actuator is configured to selectively adjust the angle of the cam relative to the longitudinal axis of the reel based upon the signals.

13. The apparatus of claim 12, wherein the sensed parameter is selected from a group of sensed parameters consisting of: crop type; crop yield; crop moisture; crop loss; harvester head height; harvester head angular positioning; harvester head pitch, harvester head roll; and relative angular positions of harvester head sections.

14. The apparatus of claim 10 further comprising:
   a second extendable bat supported door that bat support, the second extendable bat having a third segment and a fourth segment overlapping the third segment, wherein the actuator comprises a second cam follower coupled to the fourth segment and in engagement with the cam, wherein rotation of the second cam follower relative to the cam is to cause the second cam follower to extend and retract the fourth segment relative to the third segment based upon the angular position of the second bat about the longitudinal axis of the reel, wherein the second segment extends from the first segment by a first distance concurrently with the fourth segment extending from the third segment by a second distance different than the first distance.

15. The apparatus of claim 14, wherein the cam comprises a swash plate having a continuous groove about the longitudinal axis of the reel and wherein the cam follower and the second cam follower are slidably received within the continuous groove.

16. The apparatus of claim 1, wherein the bat further comprises a third segment overlapping the second segment and wherein the harvester head reel further comprises:
   an actuator connected to the third segment to extend and retract the third segment relative to the first segment based upon an angular position of the bat about a longitudinal axis of the reel as the bat rotates about the longitudinal axis of the reel, wherein the second segment extends and retracts relative to the first segment and the third segment in response to extension and retraction of the third segment.

17. The apparatus of claim 1, wherein the second segment extends and retracts relative to the first segment based upon an angular position of the bat about a longitudinal axis of the reel as the bat rotates about the longitudinal axis of the reel and wherein the second segment extends from the first segment by a first extent when at a top of the reel and extends from the first segment by a second extent greater than the first extent when at a bottom of the reel.

18. The apparatus of claim 1 further comprising a reel arm supporting an end of the reel and having a forward terminus, wherein the second segment extends and retracts relative to the first segment based upon an angular position of the bat about a longitudinal axis of the reel as the bat rotates about the longitudinal axis of the reel and wherein the second segment extends from the first segment by a first extent when behind the forward terminus and extends from the first segment by a second extent greater than the first extent when forward the forward terminus.

19. An apparatus comprising:
   a harvester head reel comprising:
      bat support;
      a first extendable bat supported by the bat support, the first extendable bat comprising:
         a first segment;
         a second segment overlapping the first segment;
         a first finger extending from the first segment; and
         a second finger extending from the second segment, the first segment and the second segment having a first collective length;
      a second extendable bat supported by the bat support, the second extendable bat comprising:
         a third segment;
         a fourth segment overlapping the third segment;
         a third finger extending from the third segment; and
         a fourth finger extending from the fourth segment, the third segment and the fourth segment having a second collective length different than the first collective length such that axial ends of the first extendable bat and the second extendable bat are co-located in a plane oblique to a rotational axis of the reel; and
      an actuator to extend and retract the second segment relative to the first segment based upon an angular position of the first extendable bat about a longitudinal axis of the harvester head reel as the first extendable bat rotates about the longitudinal axis of the harvester head reel.

* * * * *